United States Patent
Akhan et al.

(10) Patent No.: US 7,085,436 B2
(45) Date of Patent: Aug. 1, 2006

(54) IMAGE ENHANCEMENT AND DATA LOSS RECOVERY USING WAVELET TRANSFORMS

(75) Inventors: Mehmet Bilgay Akhan, Egham (GB); Alptekin Temizel, Guildford (GB); Anil Aksay, Guildford (GB)

(73) Assignee: visiOprime, Guildford (GB)

( * ) Notice: Subject to any disclaimer, the term of this patent is extended or adjusted under 35 U.S.C. 154(b) by 779 days.

(21) Appl. No.: 10/224,747

(22) Filed: Aug. 20, 2002

(65) Prior Publication Data

US 2003/0053717 A1   Mar. 20, 2003

(51) Int. Cl.
*G06K 9/36* (2006.01)

(52) U.S. Cl. ............... 382/298; 382/240; 382/300; 375/240.19

(58) Field of Classification Search ........... 382/240, 382/298–300; 345/671; 348/581, 704; 375/240.19
See application file for complete search history.

(56) References Cited

U.S. PATENT DOCUMENTS

| | | | | |
|---|---|---|---|---|
| 4,710,809 A | * | 12/1987 | Ries et al. | 348/144 |
| 4,933,983 A | * | 6/1990 | Hiramatsu et al. | 382/112 |
| 6,005,983 A | | 12/1999 | Anderson et al. | |
| 6,233,358 B1 | | 5/2001 | Acharya | |
| 6,236,765 B1 | * | 5/2001 | Acharya | 382/276 |
| 6,456,745 B1 | * | 9/2002 | Bruton et al. | 382/298 |

FOREIGN PATENT DOCUMENTS

| | | | |
|---|---|---|---|
| JP | 07152907 A | * | 6/1995 |
| JP | 2000215305 A | * | 8/2000 |

OTHER PUBLICATIONS

Li et al., "Wavelet Domain Superresolution Reconstruction of Infrared Image Sequences," Proc. SPIE vol. 4385, 2001, pp. 108-116.*

* cited by examiner

*Primary Examiner*—Jingge Wu
*Assistant Examiner*—Yubin Hung
(74) *Attorney, Agent, or Firm*—Sawyer Law Group LLP (57) ABSTRACT

Methods and systems for image and video enhancement and data-loss recovery using wavelet transforms are disclosed. A wavelet transformed image is defined as multiple sections, where one section is the original image, and coefficients are estimated for each other section using information obtained from that section. An inverse wavelet transform on the wavelet transformed image obtains an enlarged image. For obtaining a high resolution video frame, one section is the original video frame, and coefficients are estimated for each other section using information from a lower level wavelet transform of a corresponding section of a past or future frame of the video sequence. For recovery of data lost from transmitted original data, the locality of the lost data is determined in lower and higher levels of a wavelet transform tree, and information at the locality in the lower and higher levels is used to estimate the lost data.

19 Claims, 8 Drawing Sheets

IMAGE ENHANCEMENT AND DATA LOSS RECOVERY USING WAVELET TRANSFORMS

FIELD OF THE INVENTION

The present invention relates to techniques for the enhancement and recovery of image data and other data, and more particularly to the use of wavelet transforms for image data enhancement and data recovery.

BACKGROUND OF THE INVENTION

One application in the manipulation of data used by computer and electronic devices is the compression and decompression of data. Storage space for data in memory devices is limited in many circumstances, so that data compression techniques are often used to reduce the amount of storage space that is needed for an image, a message, or other block of data. Once compressed and stored, the compressed data is eventually decompressed into its uncompressed, original form using an algorithm or technique complementary to the compression technique. Some types of compression are known as lossy, where some data is lost in the compression and decompression process. However, in many applications, such as image compression, the lost data typically does not make a noticeable or practical difference in the final use or application of the data.

One lossy compression technique that is used often in recent years is known as wavelet-based compression. In this type of compression, a wavelet transform is used to reduce the amount of data with little noticeable loss. One type of wavelet transform that can be performed using digital processors and circuits is the Discrete Wavelet Transform (DWT), which uses discrete samples of a continuous wavelet, and can be similar to a filtering technique with discrete coefficients. The DWT can be tuned to a particular application or input, allowing it in many cases to be more useful for applications such as image compression or enhancement than other transforms such as the discrete cosine transform (DCT) or averaging filters. For example, the JPEG2000 still image compression standard is wavelet-based.

Data enhancement is useful and desirable in a wide variety of computer-and electronic-based applications. A data enhancement application that can be related to data compression is image enlargement. Instead of decompressing a compressed image, an original, uncompressed image is enlarged to a greater size. This can be useful in many applications; for example, an original image in a lower resolution may be too small to fit a particular screen size and preferably should be enlarged. Also, super resolution images can be created from smaller images for prints or photographic quality pictures. Video images or streams can be enhanced by increasing the resolution of the particular video images or by estimating entire frames between existing frames to increase the smoothness of motion perceived in the visual presentation.

When enlarging images, different techniques can be employed. Some prior methods include duplicating pixels to achieve the higher resolution, or using a bi-linear interpolation or other averaging technique. However, these techniques typically result in images of poor quality, having a "blocky" appearance or rough contours.

Other enlargement techniques may use wavelet transforms in similar ways to wavelet-based compression. For example, one technique of the prior art constructs virtual DWT sub-bands from an image without performing the DWT and applies an Inverse Discrete Wavelet Transform (IDWT) upon the virtual sub-bands, where the result of the IDWT represents an up-sampled (enlarged) version of the image. However, since the virtual sub-bands to be used with the IDWT do not exist, they are simply zeroed. The result is a regenerated image that may be better than other standard techniques but the regenerated image still typically has low quality.

Data enhancement can also include recovering lost data in communication channels. For example, data can get lost during transmission and reception, over any kind of communication channel. The recovery of the lost data is important for reliable communications. However, existing techniques may not recover data as reliably as desired for image, video, and other kinds of data transmission.

SUMMARY OF INVENTION

A method and system for image enhancement and data-loss recovery using wavelet transforms is disclosed. In a first aspect, a method and system comprises defining a wavelet transformed image as a plurality of sections, wherein one of the sections is the original image and estimating coefficients in estimated sections of the wavelet transformed image. The coefficients are estimated for each particular estimated section using information obtained from that section. The method and system includes performing an inverse wavelet transform on the wavelet transformed image. The wavelet transformed image, including the original image and the estimated sections, to obtain the enlarged image.

In a second aspect, a method and system for creating high resolution video frames in a video sequence is disclosed: The method and system comprise defining a wavelet transformed frame as a plurality of sections, wherein one of the sections is a present video frame and estimating coefficients in estimated sections of the wavelet transformed frame. The coefficients are estimated for each particular estimated section using information from a lower level wavelet transform of a corresponding section of a past or future frame of the video sequence. The method and system also includes performing an inverse wavelet transform on the wavelet transformed frame. The wavelet transformed frame includes the present video frame and the estimated sections, to obtain a high resolution video frame having a greater resolution than the present video frame.

In a third aspect, a method and system for recovering data lost from original data during transmission of the original data in a communication channel is disclosed. The method and system comprise determining the locality of the lost data in a wavelet transform tree, the wavelet transform tree having been created from the original data before transmission; determining the locality of the lost data in lower and higher levels of the wavelet transform tree and in wavelet transform quadrants corresponding to the locality of the lost data; and using information at the locality in the lower and higher levels of the wavelet transform tree to estimate the lost data.

The present invention provides several methods and apparatus for providing enhanced, high resolution images and enhanced video sequences, and for recovering data lost during transmission. The techniques described allow images to be expanded in size and resolution with little loss in quality, and allows video frames to be reconstituted to create a smoother video presentation. The data recovery techniques allow lost data to be reliably reconstituted and allow the most important data to be transmitted with little loss.

DETAILED DESCRIPTION OF PREFERRED EMBODIMENTS

The present invention relates to techniques for the enhancement and recovery of image data and other data, and more particularly to the use of wavelet transforms for image data enhancement and data recovery. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Several embodiments and examples of the present invention are described below. While particular applications and methods are explained, it should be understood that the present invention can be used in a wide variety of other applications and with other techniques within the scope of the present invention.

The present invention includes the use of wavelet transforms. Wavelet transforms have substantial advantages over conventional Fourier transforms for analyzing nonlinear and non-stationary time series. These transforms are used in a variety of applications, some of which include data smoothing, data compression, and image reconstruction, among many others.

Wavelet transforms such as the Discrete Wavelet Transform (DWT) can process a signal to provide discrete coefficients, and many of these coefficients can be discarded to greatly reduce the amount of information needed to describe the signal. One area that has benefited the most from this particular property of the wavelet transforms is image processing. The DWT can be used to reduce the size of an image without losing much of the resolution. For example, for a given image, the DWT of each row can be computed, and all the values in the DWT that are less then a certain threshold can be discarded. Only those DWT coefficients that are above the threshold are saved for each row. When the original image is to be reconstructed, each row can be padded with as many zeros as the number of discarded coefficients, and the inverse Discrete Wavelet Transform (IDWT) can be used to reconstruct each row of the original image. Or, the image can be analyzed at different frequency bands, and the original image reconstructed by using only the coefficients that are of a particular band.

Figure 1:
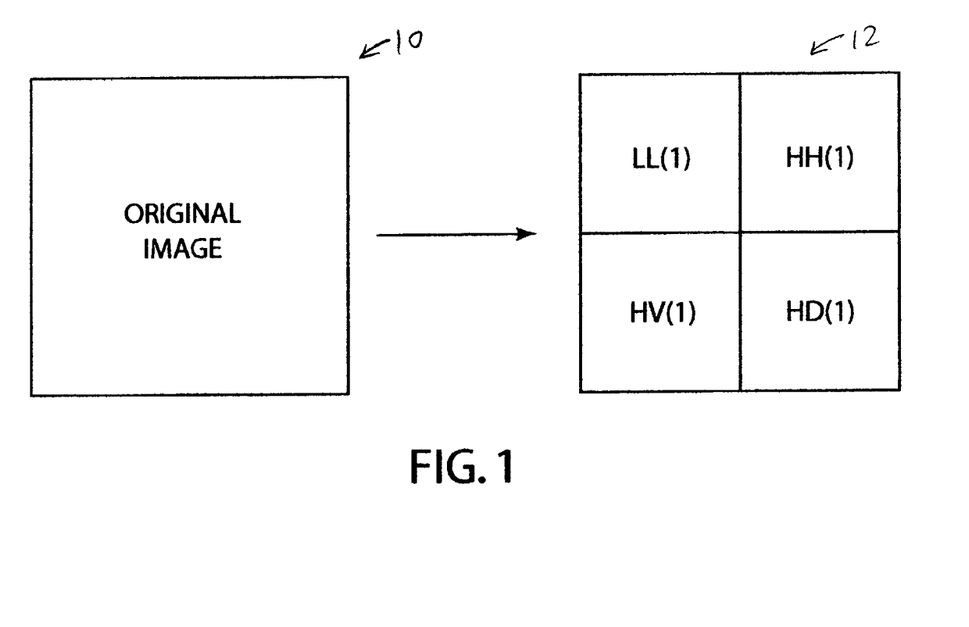
FIG. 1 is a diagrammatic illustration of the transformation of an original image into a one-level wavelet transformed image.

FIG. 1 illustrates the transformation of an original image 10 into a one-level sub-sampled image 12. Wavelet transforms can decompose an original image into sub-images, each sub-image representing a frequency subset of the original image. Wavelet transforms sub-sample the image to provide a successive decomposition of the original image into high- and low-frequency components. One level of two dimensional wavelet transform creates four sub-sampled separate quarters, each containing different sets of information about the image. It is conventional to name the top left quarter Low-Low (LL)—containing low frequency horizontal and low frequency vertical information; the top right quarter High-Horizontal (HH)—containing high frequency horizontal information; the bottom left quarter High-Vertical (HV)—containing high frequency vertical information; and the bottom right quarter High-Diagonal (HD)—containing high frequency diagonal information. The level of transform is denoted by a number suffix following the two-letter code. For example, LL(1) refers to the first level of transform and denotes the top left corner of the sub-sampled image 12.

Figure 2:
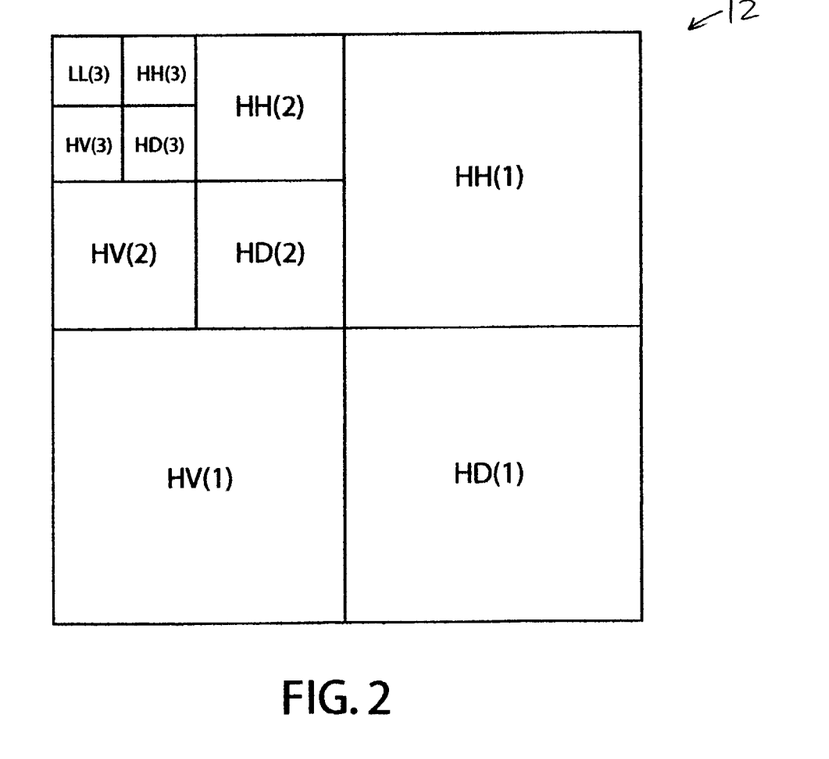
FIG. 2 is a diagrammatic illustration of the transformation of a portion of an original image into three levels using a wavelet transform.

Typically, wavelet transforms are performed for more than one level. FIG. 2 illustrates further transforms that have been performed on the LL quarter of the sub-sampled image 12 to create additional sub-sampled images. The second transform performed on the LL(1) quarter produces four second level quarters within the LL(1) quarter which are similar to the first level quarters, where the second level quarters are labeled as LL(2) (not shown), HH(2), HD(2), and HV(2). A third transform performed on the LL(2) quarter produces four third level quarters labeled as LL(3), HH(3), HD(3), and HV(3). Additional transforms can be performed to create sub-sampled images at lower levels. A hierarchy of sub-sampled images from wavelet transforms, such as the three levels of transform shown in FIG. 2, is also known as a "wavelet transform tree."

Figure 3:
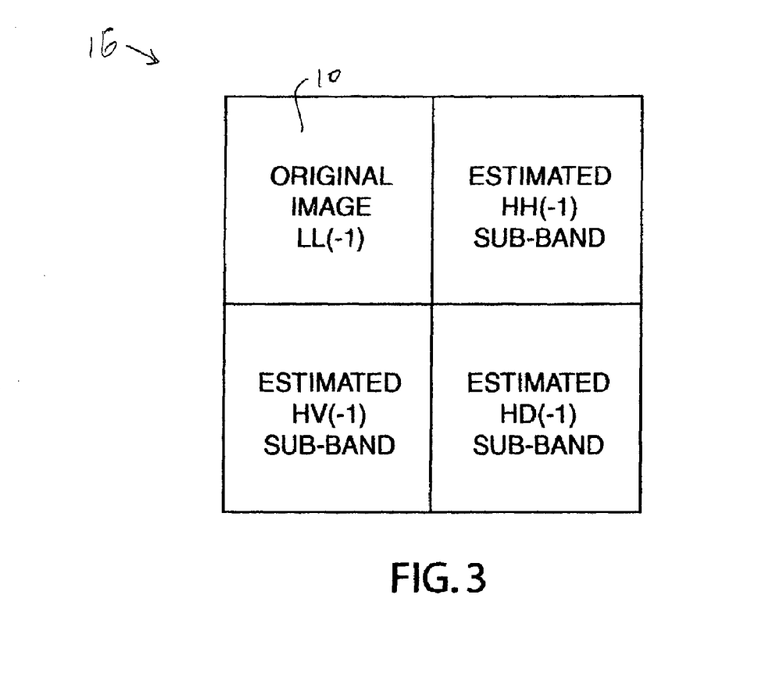
FIG. 3 is a diagrammatic illustration of the original image and estimated wavelet coefficient quarters of the present invention before inverse discrete wavelet transformation.

FIG. 3 is a diagrammatic illustration 16 of a technique used in the present invention for providing images of increased resolution from an original image. The present invention takes the original image 10 and up-scales it using an inverse wavelet transform by assuming the original image 10 is the LL quarter LL(−1) of a sub-sampled, wavelet transformed image of the up-scaled image for the next level. The other, remaining blocks, high frequency quadrants HH, HD, and HV, do not exist and are estimated as sub-bands: quarters HH(−1), HD(−1), and HV(−1), as detailed further below. The blocks for this original and first estimated level can be designated with (−1), since they are provided for transformations in the opposite direction to a standard wavelet transform, which provides levels in a positive number direction and where the original image itself can be thought of as four quarters at level 0. The original image and these estimated quarters are then used in an inverse DWT (IDWT) to obtain an image having double the size and may result in an increase in resolution of the original image in both x and y directions. The accuracy of the estimation technique determines the final quality of the image. This process can be repeated any number of times to obtain super-resolution images from the original image. For example, the higher resolution image obtained from the IDWT is again used as the LL quarter and the other three quarters are estimated, and the four quarters are inverse transformed to obtain an even higher resolution image.

Figure 4:
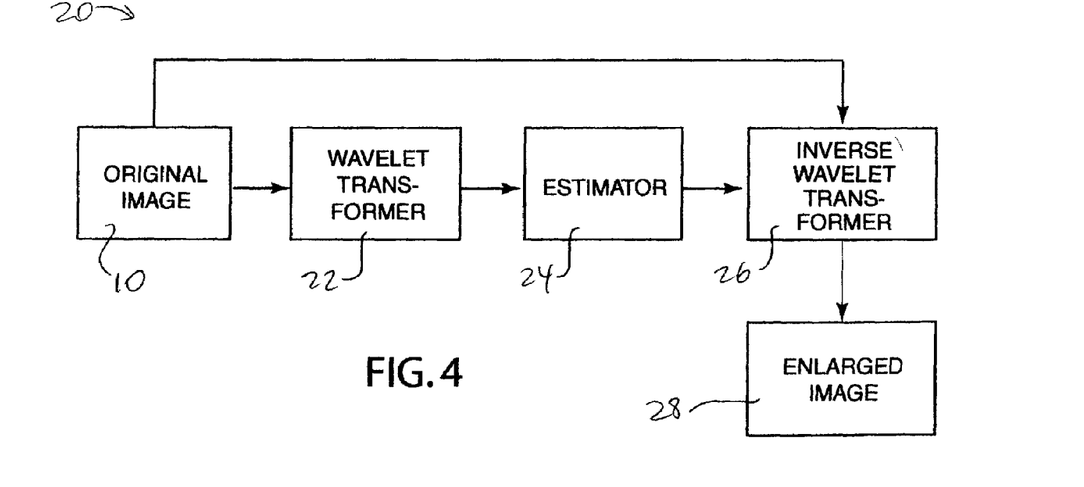
FIG. 4 is a block diagram illustrating the present invention for enlarging a still image.

FIG. 4 is a block diagram 20 illustrating the present invention for enlarging a still image. The block diagrams and flow diagrams illustrated herein are preferably implemented using software on any suitable general-purpose computer or the like, having microprocessor, memory, and appropriate peripherals, where the software is implemented with program instructions stored on a computer readable medium (memory device, CDROM or DVDROM, magnetic disk, etc.). The block diagrams and methods can alternatively be implemented using hardware (logic gates, etc.) or a combination of hardware and software.

The original image 10 is input to a wavelet transformer 22. The wavelet transformer 22 provides a number of wavelet transforms of the original image, e.g. at levels 1, 2, 3, etc., which are then used in the estimation of the unknown quarters at the −1 level, as described below. The number of iterations of wavelet transform is not fixed, so that a wavelet transform can be applied as many times as needed for the desired amount of up-scaled resolution, depending on how many levels of transform is to be used by the estimation block. Next, in the estimator 24, HH, HD, and HV blocks having the same size as the original image are estimated using the coefficients of the known LL block (original image) and the coefficients in the lower levels of wavelet transforms of the original image obtain by the transformer 22. At the first (original) level of estimation, the blocks are labeled HH(−1), HD(−1), and HV(−1). The original image is used as the LL(−1) sub-band of the level (−1) wavelet transformed image, as the dynamic range of wavelet coefficients are different from the dynamic range of pixels in spatial domain, pixels are scaled linearly according to the upper and lower limits of the dynamic ranges and the estimated blocks are provided as the appropriate sub-bands of the level (−1) wavelet transformed image. Next, the Inverse Discrete Wavelet Transformer 26 applies the IDWT to the original image and estimated sub-bands. The output of the transformer 26 is an enlarged image 28 having twice the size of the original image. If an even larger or higher resolution image is desired, the enlarged image 28 can be fed back to the estimator 24, since the lower level transforms are already known from the previous iteration, wavelet transformation is not necessary for further enlargement. The process can be repeated further for even higher resolution images.

Figure 5:
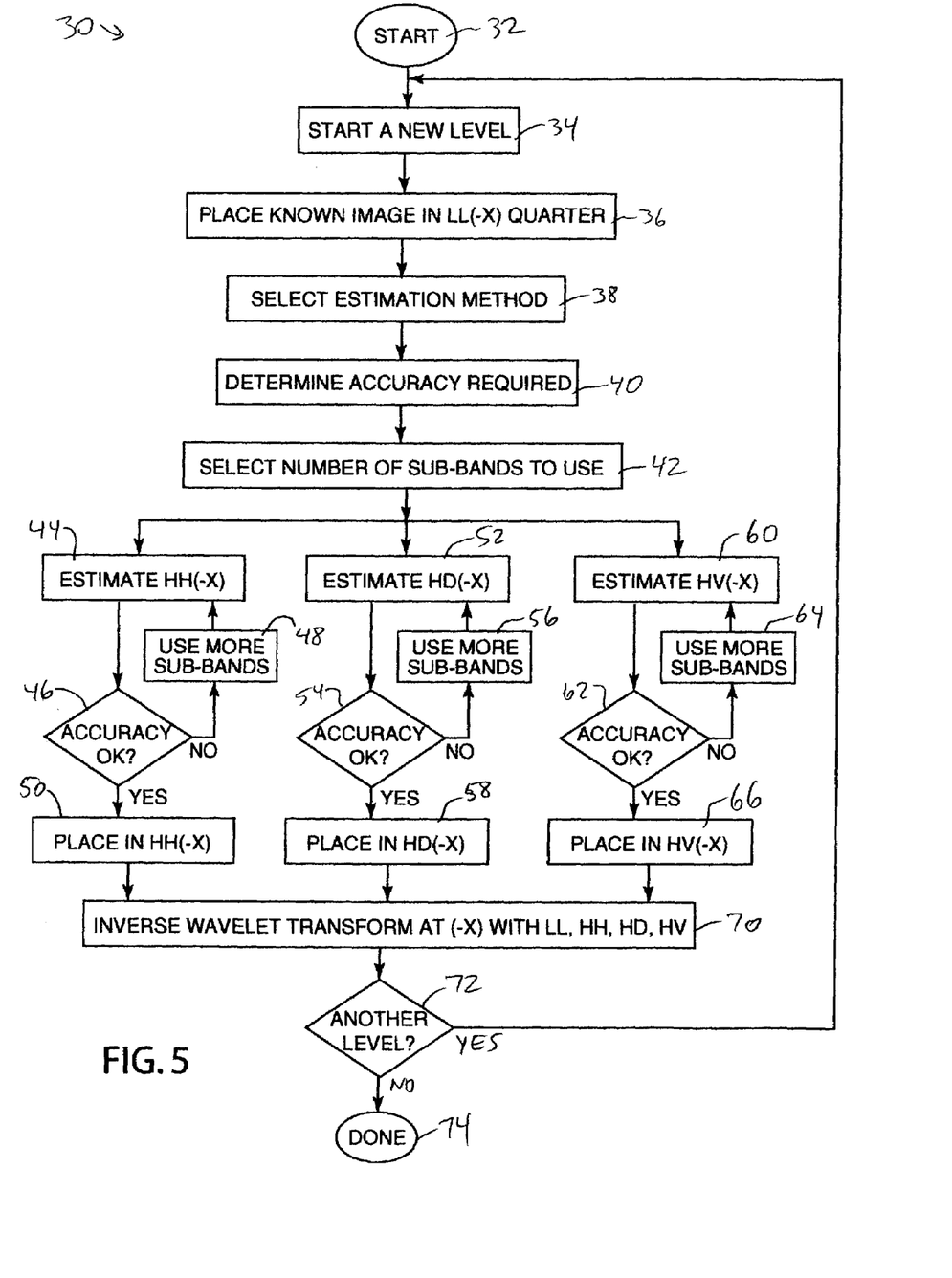
FIG. 5 is a flow diagram illustrating an iterative process of the present invention for creating a still image of enhanced resolution from an original image.

FIG. 5 is a flow diagram 30 that illustrates an iterative process of the present invention for creating a still image of enhanced resolution from an original image. The process begins at step 32, and in step 34, a new level of the transform is started. If it is the first iteration of this process, then the new level is the (−1) level, as explained above. In step 36, the known image is placed in the LL(−x) quarter. The "known image" is the original image the first time through the process, and in later iterations is the image resulting from the immediately previous transformation. The designation "x" is the current level of transform, e.g., x is 1 in the first iteration.

In step 38, the estimation method is selected for the current process. The estimation method can be one or more any of a plurality of different available types; one estimation method may be more efficient or require less computation than another method, while a different estimation method may provide higher quality images, so that the most effective estimation method for a particular desired result can be selected based on criteria provided by the user or by using an analysis method Some examples of estimation methods of the present invention are described below.

In step 40, the accuracy required for the present transformation is determined. The level of accuracy can be based on how much computation resources the user wishes to allocate, the time taken to perform the transforms, or other criteria of the user. In general, the greater the number of transforms taken (to lower levels), the greater the accuracy obtainable. But, in this embodiment a coefficient in a lower level corresponds to 4 coefficients in a next upper level. Similarly, each of these 4 coefficients corresponds to 4 coefficients in the next upper level, making one coefficient corresponding to 16 coefficients in two level above and 64 coefficients in the three level above. As this number increases according to the number of difference in level, if too many levels of transform is taken, the information extracted from the lowest level coefficients doesn't help estimation of the wavelet coefficients, because they correspond to too many coefficients representing a large spatial area.

In step 42, the number of sub-bands (levels of transform) to be used is selected This determines the accuracy of the estimation of a quarter; thus, the number of sub-bands is based upon the desired accuracy as determined in step 40.

In step 44, the HH(−x) quarter is estimated using HH level coefficients of the transform. In step 46, it is checked whether the accuracy of the estimated HH quarter is sufficient. If not sufficient, in step 48, more sub-bands are provided, e.g., more coefficients from other transform levels are provided. The additional sub-bands here can be taken from transforms on the original image previously performed as decided in steps 40 and 42. Alteratively, the transforms on the original image can be performed on the fly, as needed. Step 44 is then performed again, where the HH(−x) quarter is estimated using the additional sub-bands so that greater accuracy is achieved. This provision of more sub-bands for greater accuracy is performed repeatedly in a similar fashion until the accuracy is at the desired level at step 46. In next step 50, the HH(−x) block that was estimated in step 44 is placed in its appropriate location for the eventual inverse transform, e.g., the HH block is placed in the top right of the wavelet transformed image.

Steps 52–58 can be performed simultaneously to steps 44–50 or sequentially, as desired. The steps 52–58 are preferably similar to steps 44–50 described above. In step 52, the HD(−x) quarter is estimated using HD coefficients of the transform. In step 54, it is checked whether the accuracy of the estimated HD quarter is sufficient. If not, in step 56, more sub-bands are provided and step 44 is performed again iteratively until the accuracy is at the desired level at step 54. In next step 58, the HD(−x) block estimated in step 52 is placed in its appropriate location for the eventual inverse transform, e.g., the HD block is placed in the bottom right of the wavelet transformed image.

Steps 60–66 are similar to steps 44–50 and 52–58 and can be performed simultaneously to steps 44–50 and 52–58 or sequentially, as desired. In step 60, the HV(−x) quarter is estimated using HV coefficients of the transform, and in step 62, it is checked whether the accuracy of the estimated HD quarter is sufficient. If not, more sub-bands are provided in step 64 and step 60 is performed again iteratively until the accuracy is at the desired level at step 62. In next step 66, the HV(−x) block estimated in step 60 is placed in its appropriate location for the eventual inverse transform, e.g., the HV block is placed in the bottom left of the wavelet transformed image.

After the steps 50, 58, and 66 are completed, step 70 is initiated, in which the inverse wavelet transform (IDWT) is performed at (−x) with the known LL block and the estimated HH, HD, and HV blocks. The result of this inverse transform after the first iteration is an image double the size of the original image. In successive iterations, greater-sized images are produced by the inverse transform. After step 70, therefore, the process checks in step 72 whether another level of estimation and transform is to be performed. Thus, if an image of greater size is desired, another transformation is performed by returning to step 34 to start a new level. At later levels (iterations), the quality of estimation is dependant on the quality of estimation at lower levels, which determines the overall quality of image expansion. If another level of transformation is not desired at step 72, then the process is complete at 74.

Estimation of Blocks

Figure 6:
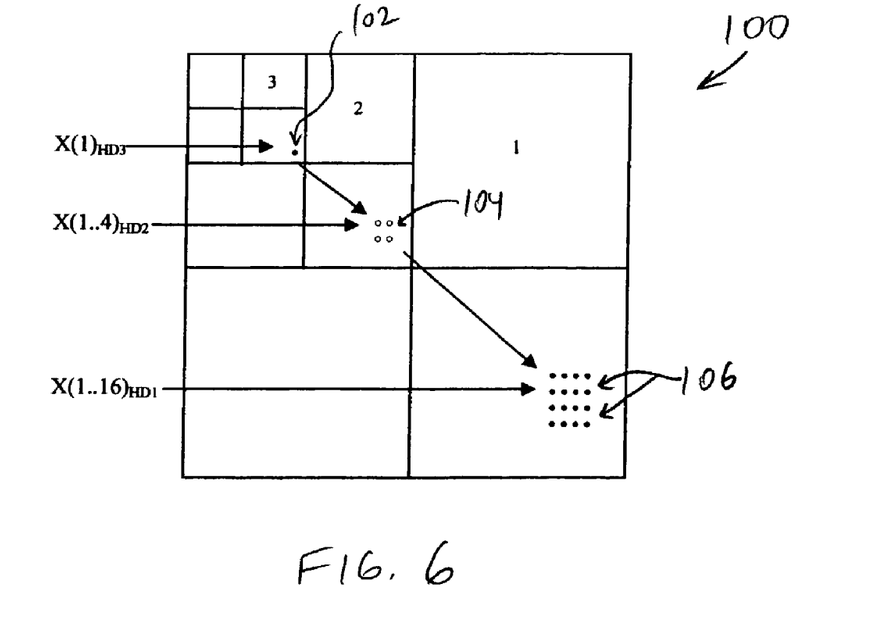
FIG. 6 is a diagrammatic illustration of the correlation of coefficients at different wavelet transform levels.

There are a number of different types of estimation and/or extrapolation methods of the present invention that can be used for steps 44, 52, and 60 in the method 30 of FIG. 3 to provide coefficients for the unknown high frequency quarters. If the original image data is not in the wavelet domain, a wavelet transform (such as DWT) of the original image can be performed. The level of the transform that is performed can be of any desired level; for example, a level 3 transform can be performed to obtain two levels of transform of the original image. Once the original image data has been transformed to the desired number of wavelet transform levels (or is already compressed in the wavelet domain), then the necessary processing is applied to obtain wavelet coefficients from the transform levels, and then correlation between the coefficients in corresponding quarters at different levels can be extracted using different mathematical models. FIG. 6 is a diagrammatic illustration 100 of this correlation between corresponding coefficients at different transform levels in the wavelet domain. One wavelet coefficient 102 at level 3, $X(1)_{HD3}$, is a child of four wavelet coefficients 104 in level 2, namely $X(1 \ldots 4)_{HD2}$, at spatially corresponding locations of the same type of quarter, in this example the HD quarter. Similarly, the four wavelet coefficients 104 are children of sixteen wavelet coefficients 106 at level 1, namely $X(1 \ldots 16)_{HD1}$, in the same type of quarter of level 1 (HD in this example).

The class and type of correlation between the wavelet coefficients at different levels vary depending on the type of image. The general rule is that the absolute values of the wavelet coefficients at corresponding spatial locations follow a pattern. Thus, once the pattern is determined, the absolute values of coefficients for unknown quarters at higher levels can be extrapolated or estimated based on the pattern determined from one or more lower levels of the transform. However, the signs of these coefficients may not necessarily follow the same pattern. In such circumstances, signs can be estimated using a suitable probability function or statistical estimation technique, for example edge information could be used while constructing this probability function; or the wavelet coefficients for this particular location can be zeroed. If the coefficients are zeroed, the quality of the enlargement may be somewhat compromised. To refine the magnitudes of the estimated coefficients, a cost function can also be used and can be applied iteratively if desired.

In a different embodiment, to estimate sign and magnitude information of the coefficients, a neural networks-based approach can be used. For example, a back-propagation learning method can be suitable. Other types of neural networks-based approaches can alternatively be used. A neural network based estimation technique allows a suitable neural network to learn a pattern of wavelet coefficients from the lower levels of the wavelet transform for each wavelet quarter separately, and for each wavelet quarter, estimate the higher levels of coefficients based on the pattern. Neural network based estimation technique is applied separately for each quarter as the pattern varies from quarter to quarter.

Figure 7:
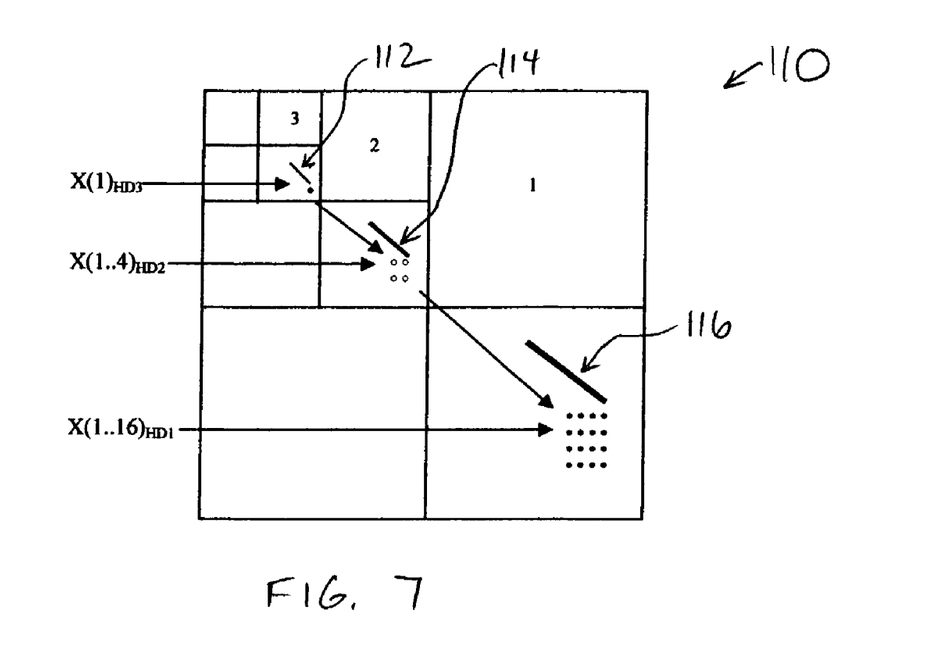
FIG. 7 is a diagrammatic illustration of the use in the present invention of quarter-specific image property information for coefficient estimation.

FIG. 7 is a diagrammatic illustration 110 of another technique for estimating wavelet coefficients. Wavelet quarters LL, HH, HD, and HV carry different types of image information at each level. This method of estimation uses this type of information to enhance the accuracy of the estimation. For example, it is known that HD quarters carry diagonal information, such as diagonal edges in the original image. Thus, in FIG. 7, the wavelet coefficient $X(1)_{HD3}$ is near a diagonal edge 112. When a coefficient at level 3 near a diagonal edge is discovered (for example, if its absolute value is above a threshold), corresponding pixel values at level 2 are estimated with greater accuracy because it is known that the diagonal information must also exist at level 2. In FIG. 7, therefore, the coefficients $X(1 \ldots 4)_{HD2}$ can be estimated more accurately since it is known that the diagonal edge 114 must be preserved. Similarly, wavelet coefficients at level 1 at the corresponding region of the image have values that can be accurately estimated, since they preserve the existence of the diagonal information 116 that corresponds to the diagonal information in lower transform levels. This image-preserving technique is image independent; an image need only have diagonal information. Some images, however, may carry mostly horizontal information; in these cases, the horizontal information can be assumed to be in other levels in the HH quarter and can be used for more accurate estimations at higher HH levels, in similar fashion to the diagonal information in HD quarters described above. Similarly, if an image carries vertical information, the vertical information can be assumed to be in other levels in the HV quarter and can be used to for more accurate estimations at higher HV quadrant levels, in similar fashion.

The information preserving technique described above can be used in combination with other coefficient estimation techniques to enhance the accuracy of the estimated coefficients. For example, the mathematical modeling of wavelet coefficients at each level at corresponding quarters can be used with information preserving in quarters.

Figure 8:
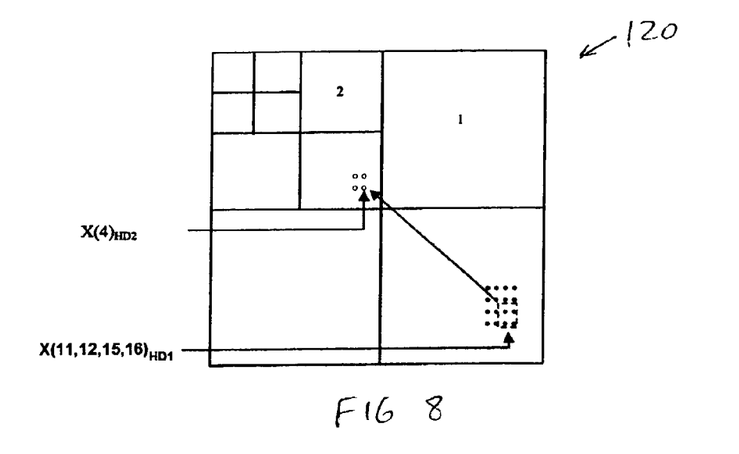
FIG. 8 is is a diagrammatic illustration of the estimation of wavelet coefficients using averaging of corresponding coefficients.

FIG. 8 is a diagrammatic illustration 120 of another technique for estimating wavelet coefficients, using an averaging technique. An average of neighboring coefficients is taken at one level and the average is used as a coefficient in the next level which corresponds to those neighboring coefficients. This is typically most effective when the changes in the averaging locality are smooth. For example, in FIG. 8, the coefficients $X(1 \ldots 16)_{HD1}$ at level 1 are known or estimated. The average of the four neighboring coefficients $X(11,12,15-16)_{HD1}$ yields a wavelet coefficient at level 2, $X(4)_{HD2}$. Likewise, the wavelet coefficient $X(3)_{HD2}$ can be estimated by averaging the four neighboring coefficients $X(9,10,13,14)_{HD1}$, and the other coefficients $X(1)_{HD2}$ and $X(2)_{HD2}$ can be similarly estimated using $X(1,2,5,6)_{HD1}$ and $X(3,4,7,8)_{HD1}$, respectively. Corresponding values at level 3 and other levels can be estimated using the same technique.

It should be noted that the above-described techniques can be combined in various ways where appropriate to achieve greater accuracy.

Video Sequences

Video sequences are composed of a series of still images (frames) that are displayed to the user one at a time at a specified rate. Video sequences can take up a lot of memory or storage space when stored, and therefore can be compressed so that they can be stored in smaller spaces. One way to compress video sequences is to remove frames, especially when a frame is positioned between two other frames in which most of the features in the frames remain constant and unchanged. Wavelet transform techniques of the present invention can be useful, when expanding a video sequence to its original (or to an even longer) length, to reconstitute the frames that have been lost during compression.

Figure 9:
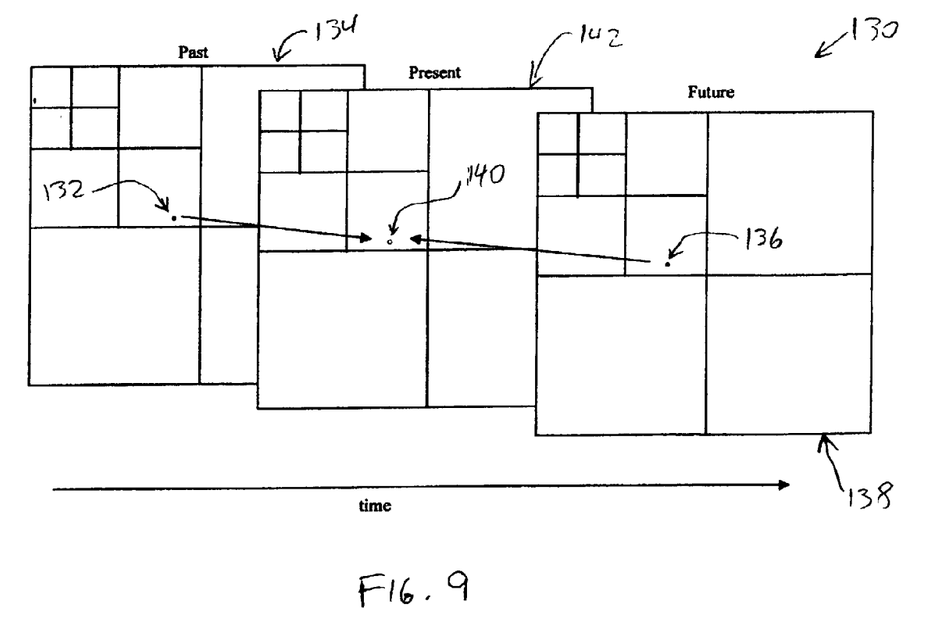
FIG. 9 is a diagrammatic illustration of a sequence of video images and a technique of the present invention to estimate wavelet coefficients.

FIG. 9 is a diagrammatic illustration 130 of a sequence of video images and a technique of the present invention to estimate wavelet coefficients. In a video sequence, although two consecutive frames are generally similar, they carry unique information. One very accurate method to estimate the wavelet transformed coefficients is to use the transformed coefficients from the past and future frames, as indicated in FIG. 9. The coefficient 132 from the most immediate past frame 134 can be compared to the coefficient 136 from the most immediate future frame 138. If the signs of these past and future coefficients are the same, then the sign for the estimated corresponding coefficient 140 in the present frame 142 is estimated to be that same sign. If the signs of the past and future coefficients 132 and 136 have different signs, then the sign of the estimated present coefficient 140 is randomly selected or estimated using the coefficients of the current frame. The absolute value of the coefficient 140 of the present frame 142 can be estimated by averaging the absolute values of the coefficients 132 and 136 from past and future frames 134 and 138 using wavelet extrapolation. More sophisticated algorithms can also be used, such as Bayesian or Projections Onto Convex Sets (POCS). The result is that the coefficients of the present frame have been estimated, and the present frame image can be reconstituted from these estimated coefficients even though the present frame had been deleted when in compressed form.

In addition, there may be a need for higher resolution video frames. Since in many cases the resolution of a video sequence is low so that the video can be displayed on a standard low-resolution television, there is a need to increase the resolution of the video images so that higher-resolution video can be viewed on higher resolution devices, such as computer screens and high definition television (HDTV).

Figure 10:
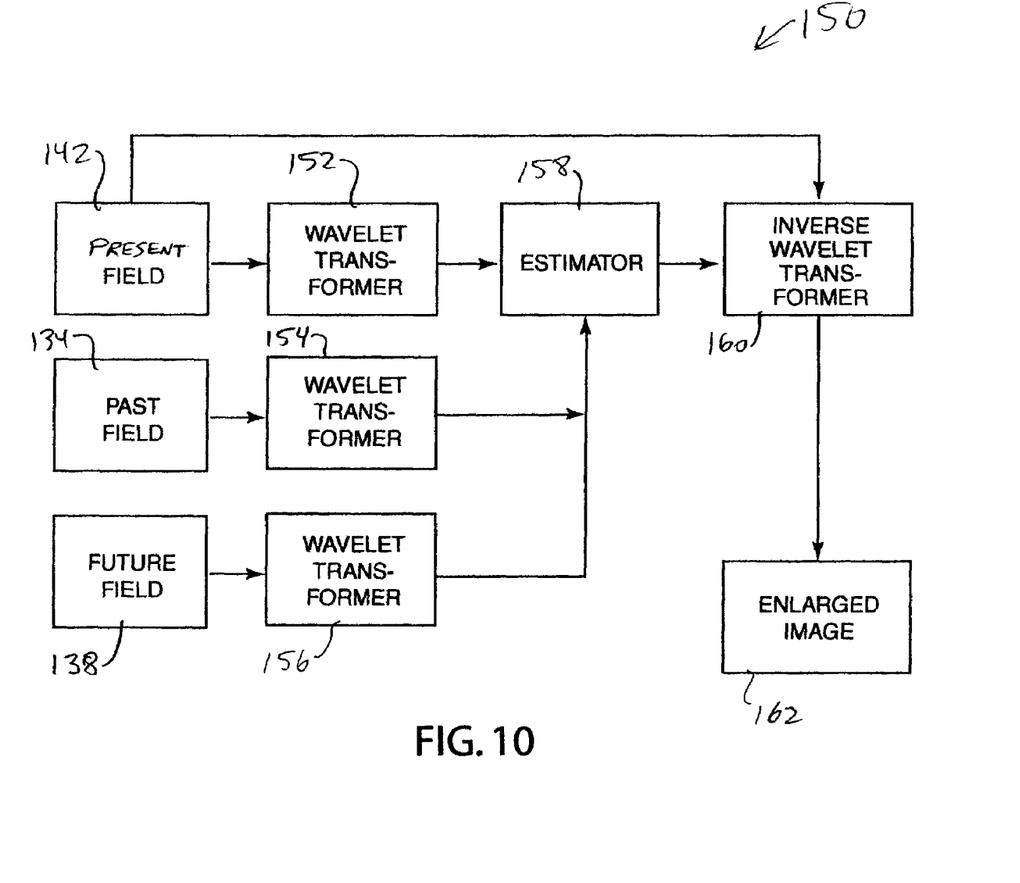
FIG. 10 is a block diagram illustrating the embodiment of the present invention for estimating wavelet coefficients in a video sequence.

When a single still image is evaluated, there is only spatial information that can be used in coefficient estimation. However, a series of images in a video sequence additionally has a temporal component, where images in the video appear to the user to move or change over time. For a video sequence, therefore, temporal information can be used in wavelet coefficient estimation to increase the accuracy of the estimated coefficients. FIG. 10 is a block diagram 150 illustrating the embodiment of the present invention for estimating wavelet coefficients in a video sequence. The present frame 142 is input to a wavelet transformer 152 to provide a number of wavelet transforms in the wavelet domain. Meanwhile, the most immediate past frame 134 is input to a wavelet transformer 154 and the most immediate future frame 138 is input to a wavelet transformer 156 to obtain one or more levels of transforms of these frames in the wavelet domains. The wavelet transformers 152, 154, and 156 can all be the same transformer, used at different times, or the same or different transformers used simultaneously.

In the estimator 158, HH, HD, and HV blocks having the same size as the present frame are estimated using the coefficients of the known blocks (e.g., the LL block). To increase the accuracy of the estimation, not only are the known coefficients from transforms of the present frame used from transformer 152, but also the coefficients from transforms of the past and future frames are used from transformers 154 and 156, as described above with reference to FIG. 9. Next, the Inverse Discrete Wavelet Transformer 160 applies the IDWT to the wavelet transformed frame, i.e., the present frame and estimated sub-bands. The output of the transformer 156 is an enlarged present frame 162 having twice the size of the original frame. Alternatively, only the past frame or the future frame data can be used in the estimation additionally to the present frame data, for a less accurate estimation. Or, additional past and/or future frame data can be used to increase the accuracy of the estimation.

Figure 11:
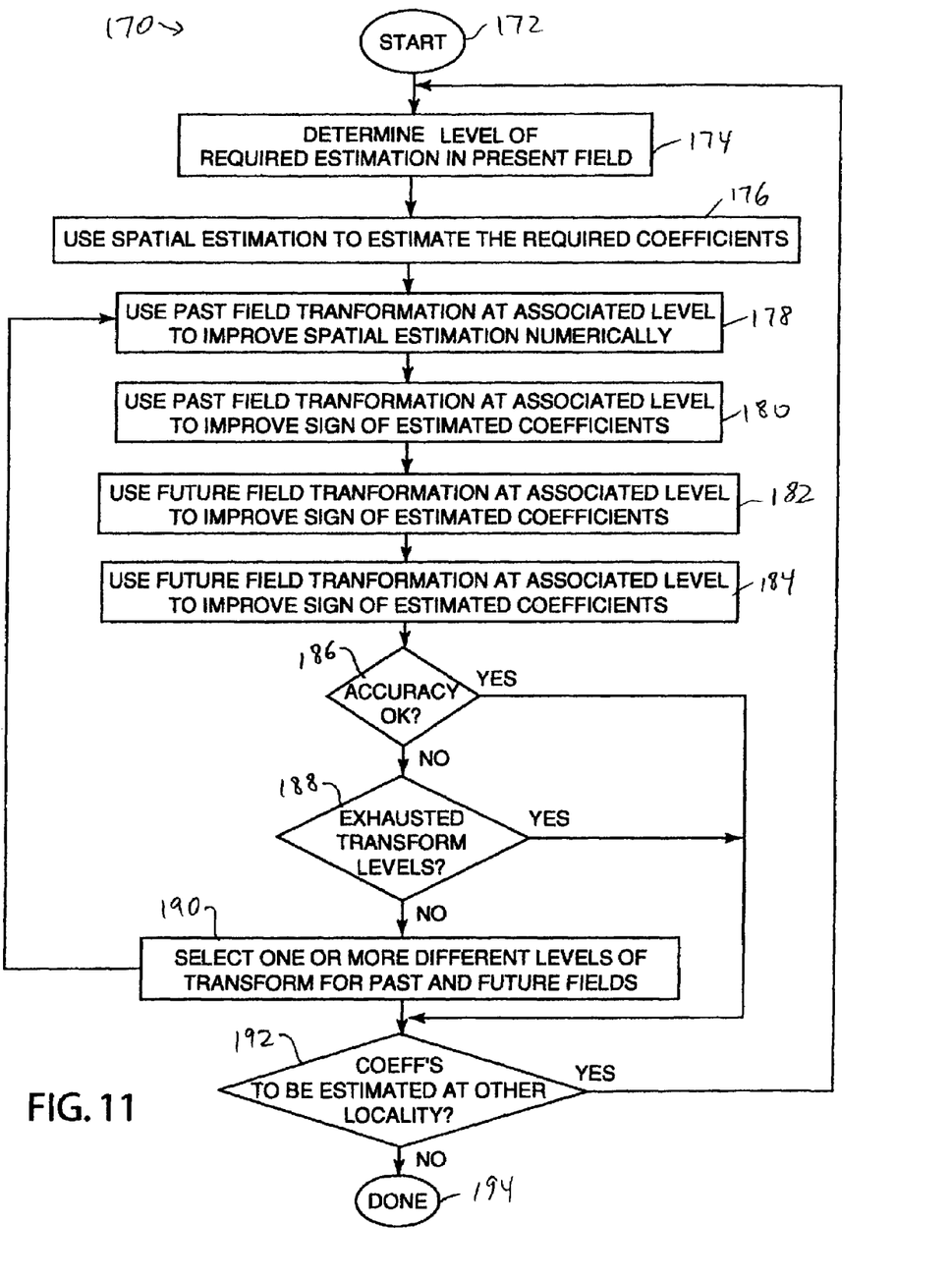
FIG. 11 is a flow diagram illustrating a process of the present invention for estimating wavelet coefficients for a series of video images to provide enlarged video images or other enhanced video images.

FIG. 11 is a flow diagram illustrating a process 170 of the present invention for estimating wavelet coefficients from a series of video images to provide enlarged video imagesor other enhanced video images. The process begins at 172, and in step 174 the level of the required estimation in the present frame is determined. For example, in an iterative process, the coefficients in the LL quarter of the present frame, followed by the HH quarter, HD quarter, and HV quarters, can be estimated, and a particular order of the coefficients in each quarter can be estimated; this step determines which coefficients to estimate. In next step 176, spatial estimation is used to estimate the required coefficients. For example, any of the above-described methods of FIGS. 5–8, or a combination thereof, can be used for coefficient estimation in this step. In next step 178, a transformation of the most immediate past frame is used to improve the spatial estimation numerically, where the transformation of the past field is at a selected level. The first iteration through the process, the past field transformation preferably has the same level as the level of transformation of the present field. In next step 180, the transformation of the past field is used to improve the sign of the estimated coefficients. In step 182, a transformation of the most immediate future frame is used to improve the spatial estimation numerically, where the transformation of the future field is at a selected level. Preferably, the future field transformation level is the same level as the level of transformation as the past field used in step 178b but can be different in other embodiments. In step 184, the transformation of the future field is used to improve the sign of the estimated coefficients. These steps are similar to steps 178 and 180. One example of steps 178 and 180 for estimating coefficients using data from past and future frames are described above with reference to FIG. 9.

In step 186, the process checks whether the accuracy of the estimated coefficients is sufficient; for example, if the rate of change of improvement in estimation has dropped below a predetermined level. When the estimation reaches to such point, the process continues at step 192, as described below. If the accuracy is not sufficient, then in step 188, the process checks whether the transform levels have been exhausted. But, after having a number of transforms, using more transform levels doesn't help estimation, as one coefficient corresponds to too many coefficients in the level in which estimation is going to be performed. Transform levels may be exhausted if all the transform levels from which meaningful information could be extracted for past and future frames have already been used in previous iterations of the present process (see below). If the levels have been exhausted, the process continues to step 192. If they are not exhausted, then the process continues to step 190, in which one or more different levels of transformation are selected for the past and future fields, and the process returns to step 178 so that steps 178, 180, 182, and 184 are performed using the newly selected levels of transformation for past and future fields. This improves the numerical and sign accuracy of the estimation. For example, if the LL(2) quarter is being estimated and the LL(2) quarters for past and future fields were already used in the first iteration, then when the process returns to step 178 for additional accuracy, the LL(1) and/or LL(3) quarters can also be used in the past and future fields. These additional quarters can be used to estimate the LL(2) quarters of those fields using appropriate techniques, such as the applicable techniques described above. With additionally accurate LL(2) quarters from past and future fields, the LL(2) quarter for the present field can be estimated with greater accuracy as well.

Once the accuracy of estimation is sufficient in step 186, and/or if the transform levels have been exhausted in step 188, the process continues to step 192, in which a check is made as to whether coefficients need to be estimated at another level of transformation. If so, the process returns to step 174, and if not, the process is complete at 194. After step 194, an inverse wavelet transform can be applied to the constructed wavelet transformed image, similar to the equivalent step as described with respect to FIG. 10, to obtain the higher resolution video frame for the present frame.

Lost Data Recovery

There are many different application areas where wavelet coefficient estimation techniques can be used to enhance images or other types of data. One such area is the recovery of lost data in noisy communication channels.

Figure 12:
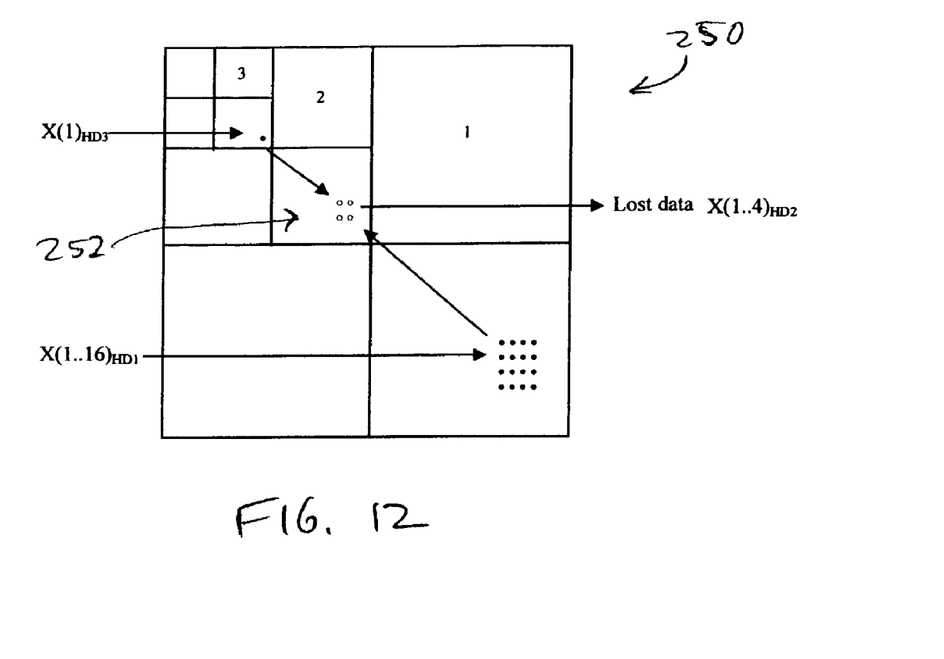
FIG. 12 is a diagrammatic illustration of an example of the recovery of data lost in a communication channel.

FIG. 12 is a diagrammatic illustration 250 of an example of the recovery of data lost in a communication channel. First, the locality of the lost data is determined in an existing wavelet transform tree. Then, the locality of the lost data is determined in lower and higher levels of transform quadrants corresponding to the locality of the lost data. Finally, information at the locality in lower and higher levels is used to estimate the lost data. For example, as shown in FIG. 12, a block of data 252 consisting of four wavelet coefficients is lost at level 2 in quarter HD, the high frequency diagonal quarter. This data is a set of wavelet transformed coefficients at level 2. Since the coefficients corresponding to this particular location are available at level 3 ($X(1)_{HD3}$) and level 1 ($X(1 \ldots 16)_{HD1}$), these known values can be used to estimate the lost coefficients at level 2. In this example, one coefficient in a block corresponds to four coefficients in the next higher level block. So one known coefficient in level 3 can be used as a "seed" for estimating the four coefficients in level 2. In addition to this, 16 known coefficients in level 1 also corresponds to these four coefficients and are employed for the estimation. If there is a lost coefficient in a lower level block, a similar estimation method can be applied to estimate the lost coefficient using the known coefficients in higher level blocks. Any of the described estimation methods or a suitable combination can be used for estimation.

Data communication channels using a wavelet coefficient estimation technique of the present invention for lost data recovery may encode data in such a way that more important data is less likely to be lost. A significant aspect of this method is the determination of which data groups or packets are more important than other data.

Due to the properties of wavelet transform, if only lower level blocks are available, images having a lower resolution than the original image resolution can still be constructed. For example, as shown in FIG. 2 above, if LL(3), HH(3), HV(3), and HD(3) are known in the LL(2) quarter, then an image having 1/16 of the original resolution can be constructed. If all these level 3 quarters are known as well as HH(2), HV(3), and HD(3), then an image having 1/4 the original resolution can be constructed. In other words, images of lower resolution than the original image can still be constructed despite the lack of higher level blocks. Another property of wavelet transforms is that the LL block of any level carries more of the character of the image than any other block (HH, HV, or HD, i.e., "H(X)" to mean any of these high frequency quarters).

Figure 13:
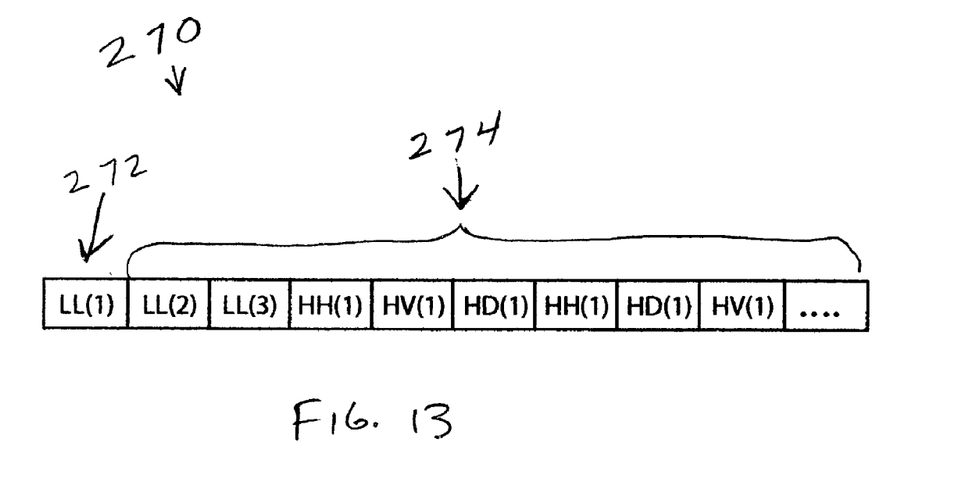
FIG. 13 is a diagrammatic illustration of the relative importance of the blocks resulting from wavelet transforms when recovering lost data in the present invention.

FIG. 13 is a diagrammatic illustration 270 of the blocks resulting from wavelet transforms, and indicates one example of defining the relative importance of the wavelet transformed blocks for lost data recovery of the present invention. As shown, the LL block 272 is the most important. Following the LL block, the H(X) blocks 274 are listed. The H(X) blocks are ordered starting from the highest numbered level as their effect on the image quality is more. Ordering is not definitive and could be done in a different manner as well and the order shown in FIG. 13 is only exemplary.

In view of the above guidelines, the data communication channel should preferably encode the wavelet transformed data in such a way as to ensure the error-free transmission of the most important blocks, such as the LL blocks, or at least to minimize the chances of data loss occurring for the more important blocks. Data loss may still occur. However, using the coefficient estimation techniques described above, wavelet coefficients can be obtained from the received data, and lost data can be recovered and the image or video sequence can be reconstructed at the higher resolution (or other data construct reconstructed) with minimal or no artefacts.

Data compression is another important application area for the use of wavelet coefficient estimation techniques. If a data loss recovery algorithm of the present invention is operating on a data communication channel, the transmitter can deliberately send less data, omitting data from those areas or blocks which the coefficient estimation algorithm can estimate with the greatest accuracy. For example, some of the lower level H(X) blocks can be purposefully omitted. This technique increases the compression of data without compromising the quality of the transmitted images or video sequences.

Although the present invention has been described in accordance with the embodiments shown, one of ordinary skill in the art will readily recognize that there could be variations to the embodiments and those variations would be within the spirit and scope of the present invention. For example, although the present invention is described in the context of a frame being divided into four quadrants, or quarters, one of ordinary skill in the art recognizes that a frame could be divided into any number of section and still be within the spirit and scope of the present invention. Accordingly, many modifications may be made by one of ordinary skill in the art without departing from the spirit and scope of the appended claims.

What is claimed is:

1. A method for creating high resolution video frames in a video sequence, the method comprising the steps of:
   (a) defining a wavelet transformed frame as a plurality of sections, wherein one of the sections is a present video frame;
   (b) estimating coefficients in estimated sections of the wavelet transformed frame, wherein the coefficients are estimated for each particular estimated section using information from a lower level wavelet transform of a corresponding section of a past or future frame of the video sequence; and
   (c) performing an inverse wavelet transform on the wavelet transformed frame, the wavelet transformed frame including the present video frame and the estimated sections, to obtain a high resolution video frame having a greater resolution than the present video frame.

2. The method of claim 1 wherein the plurality of sections are quarters of the frame.

3. The method of claim 2 wherein the coefficients are estimated for each particular estimated quarter also using information obtained from at least one lower level wavelet transform of the present video frame for that particular estimated quarter.

4. The method of claim 2 wherein the coefficients estimated are non-zero coefficients.

5. The method of claim 2 wherein the estimating step (b) includes the step of (b1) finding a correlation of wavelet coefficients at different transform levels and extrapolating the correlation to higher levels using a pattern.

6. The method of claim 5 wherein the estimation is improved in accuracy by using the same level of transform in the past frame of the video sequence and using the same level of transform in the future frame of the video sequence.

7. The method of claim 6 wherein the past frame being just previous to the present frame and the future frame being just after the present frame in the video sequence.

8. The method of claim 1 further comprising the step of (d) improving the accuracy of the estimate of coefficients by using additional levels in wavelet transform sections in the past frame and future frame of the video sequence.

9. The method of claim 1 wherein the estimating step (b) includes the step of (b1) averaging the absolute values of the coefficients from the past and future frames using wavelet extrapolation.

10. A system for creating high resolution video frames in a video sequence, the system comprising:
    a wavelet transformer for defining a wavelet transformed frame as a plurality of sections, wherein one of the sections is a present video frame;
    an estimator estimating coefficients in estimated sections of the wavelet transformed frame, wherein the coefficients are estimated for each particular estimated section using information from a lower level wavelet transform of a corresponding section of a past or future frame of the video sequence; and
    an inverse transform mechanism for performing an inverse wavelet transform on the wavelet transformed frame, the wavelet transformed frame including the present video frame and the estimated sections, to obtain a high resolution video frame having a greater resolution than the present video frame.

11. The system of claim 10 wherein the plurality of sections are quarters of the frame.

12. The system of claim 11 wherein the coefficients are estimated for each particular estimated quarter also using information obtained from at least one lower level wavelet transform of the present video frame for that particular estimated quarter.

13. The system of claim 12 wherein the coefficients estimated are non-zero coefficients.

14. The system of claim 12 wherein the estimating step (b) includes the step of (b1) finding a correlation of wavelet coefficients at different transform levels and extrapolating the correlation to higher levels using a pattern.

15. The system of claim 14 wherein the estimation is improved in accuracy by using the same level of transform in the past frame of the video sequence and using the same level of transform in the future frame of the video sequence.

16. The system of claim 15 wherein the past frame being just previous to the present frame and the future frame being just after the present frame in the video sequence.

17. The system of claim 10 further comprising means for improving the accuracy of the estimate of coefficients by using additional levels in wavelet transform sections in the past frame and future frame of the video sequence.

18. The system of claim 10 wherein the estimator includes means for averaging the absolute values of the coefficients from the past and future frames using wavelet extrapolation.

19. A computer readable medium containing program instructions for creating high resolution video frames in a video sequence, the program instructions for:
    (a) defining a wavelet transformed frame as a plurality of sections, wherein one of the sections is a present video frame;
    (b) estimating coefficients in estimated sections of the wavelet transformed frame, wherein the coefficients are estimated for each particular estimated section using information from a lower level wavelet transform of a corresponding section of a past or future frame of the video sequence; and
    (c) performing an inverse wavelet transform on the wavelet transformed frame, the wavelet transformed frame including the present video frame and the estimated sections, to obtain a high resolution video frame having a greater resolution than the present video frame.

* * * * *